Feb. 28, 1956  B. H. MOSBACHER  2,736,267
PUMP, MOTOR OR LIKE DEVICE
Filed April 29, 1950  5 Sheets-Sheet 1

Inventor
Bruce H. Mosbacher
Fishburn & Mullinore
Attorneys

Feb. 28, 1956   B. H. MOSBACHER   2,736,267
PUMP, MOTOR OR LIKE DEVICE
Filed April 29, 1950   5 Sheets-Sheet 2
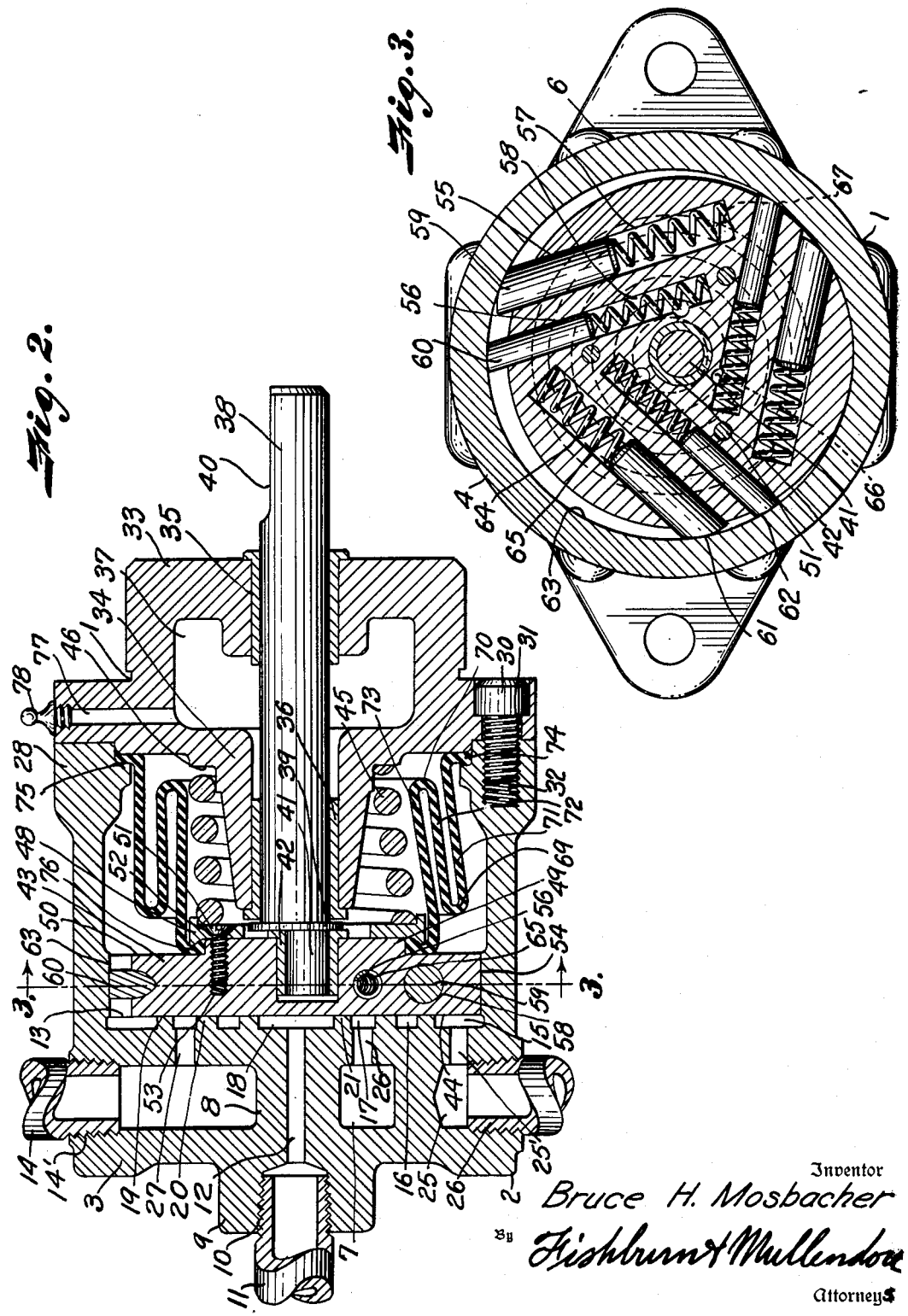
Inventor
Bruce H. Mosbacher
By Fishburn & Mullendore
Attorneys Feb. 28, 1956  B. H. MOSBACHER  2,736,267
PUMP, MOTOR OR LIKE DEVICE
Filed April 29, 1950  5 Sheets-Sheet 3
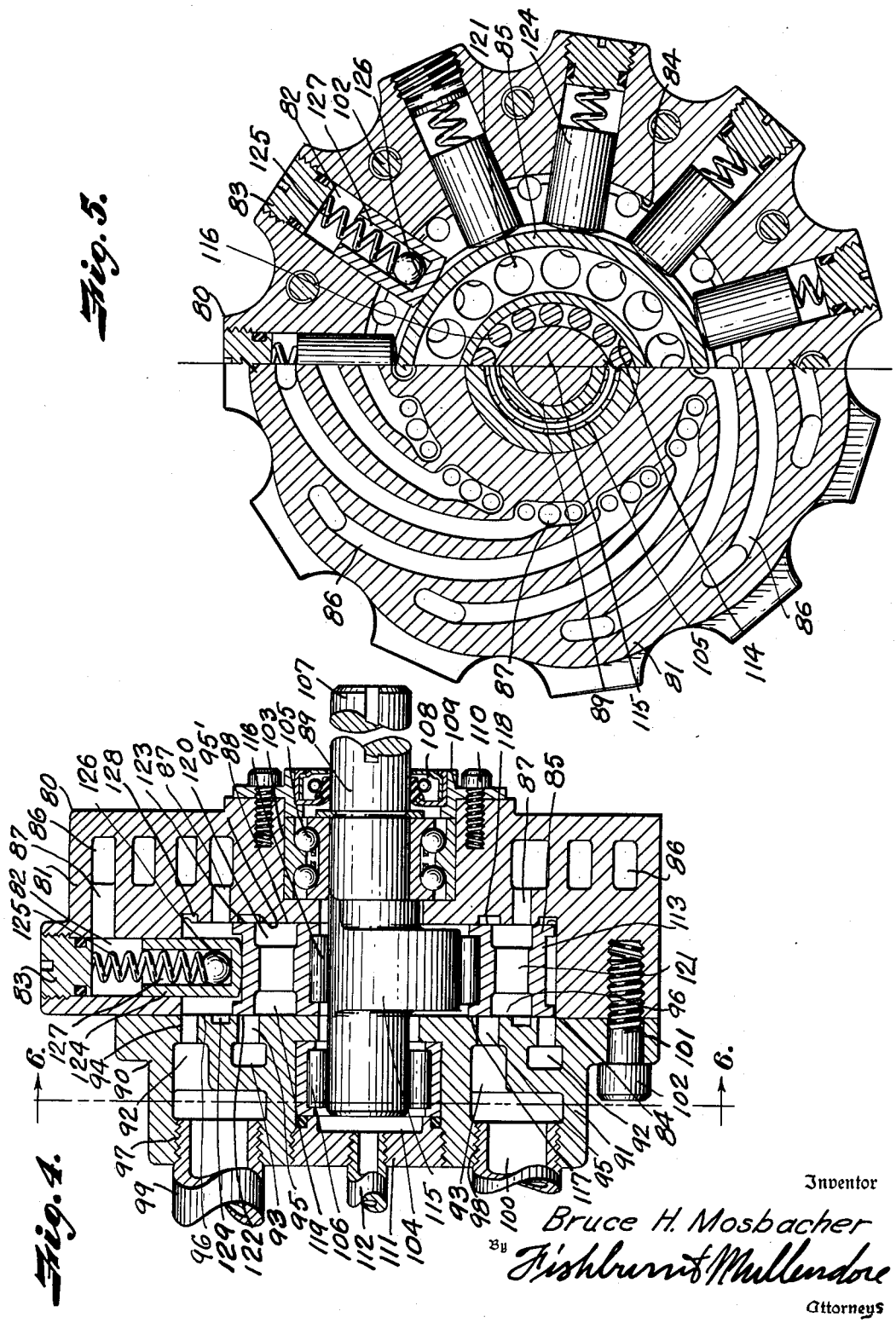
Inventor
Bruce H. Mosbacher
By Fishburn & Mullendore
Attorneys

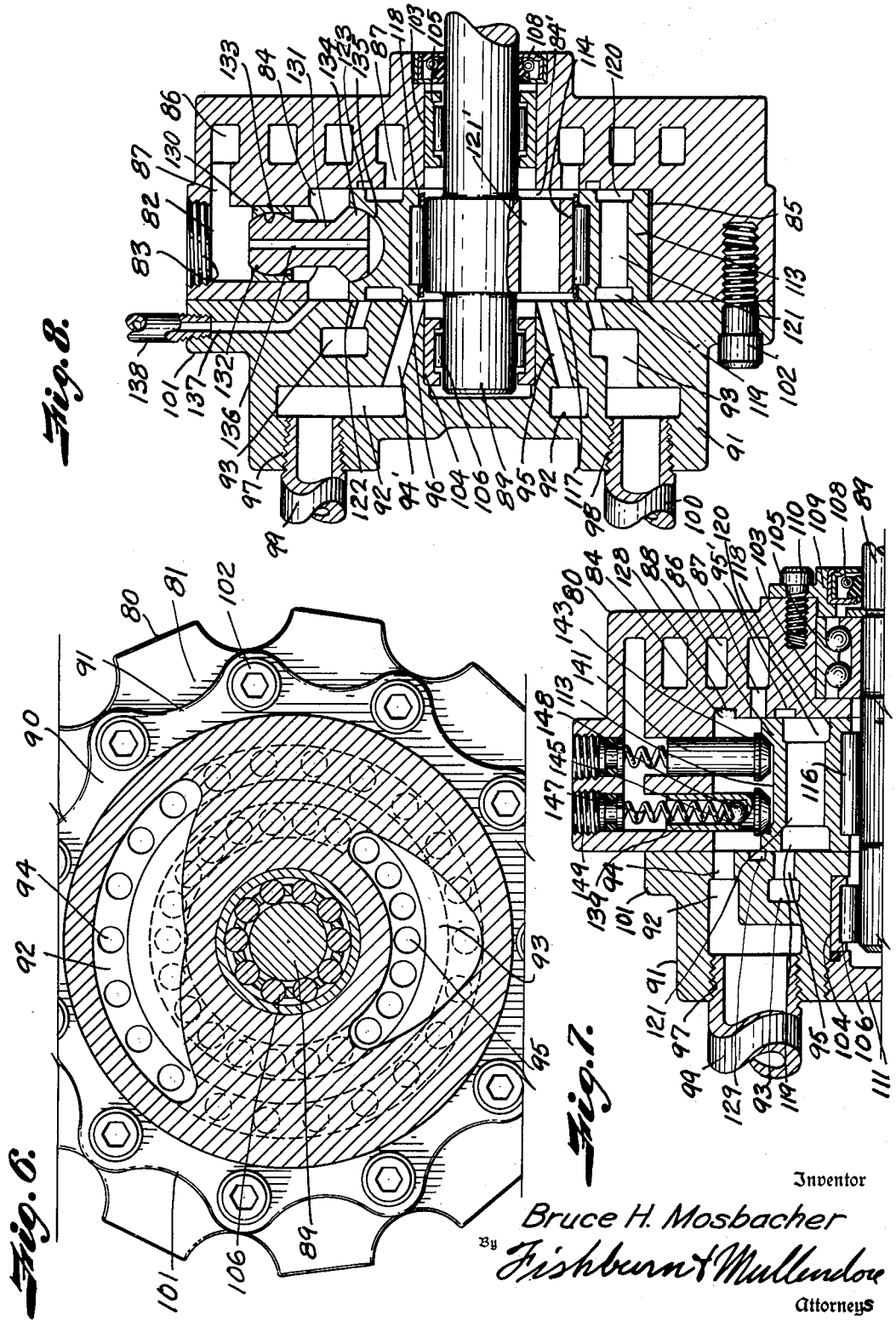

Feb. 28, 1956
B. H. MOSBACHER
2,736,267
PUMP, MOTOR OR LIKE DEVICE
Filed April 29, 1950
5 Sheets—Sheet 5
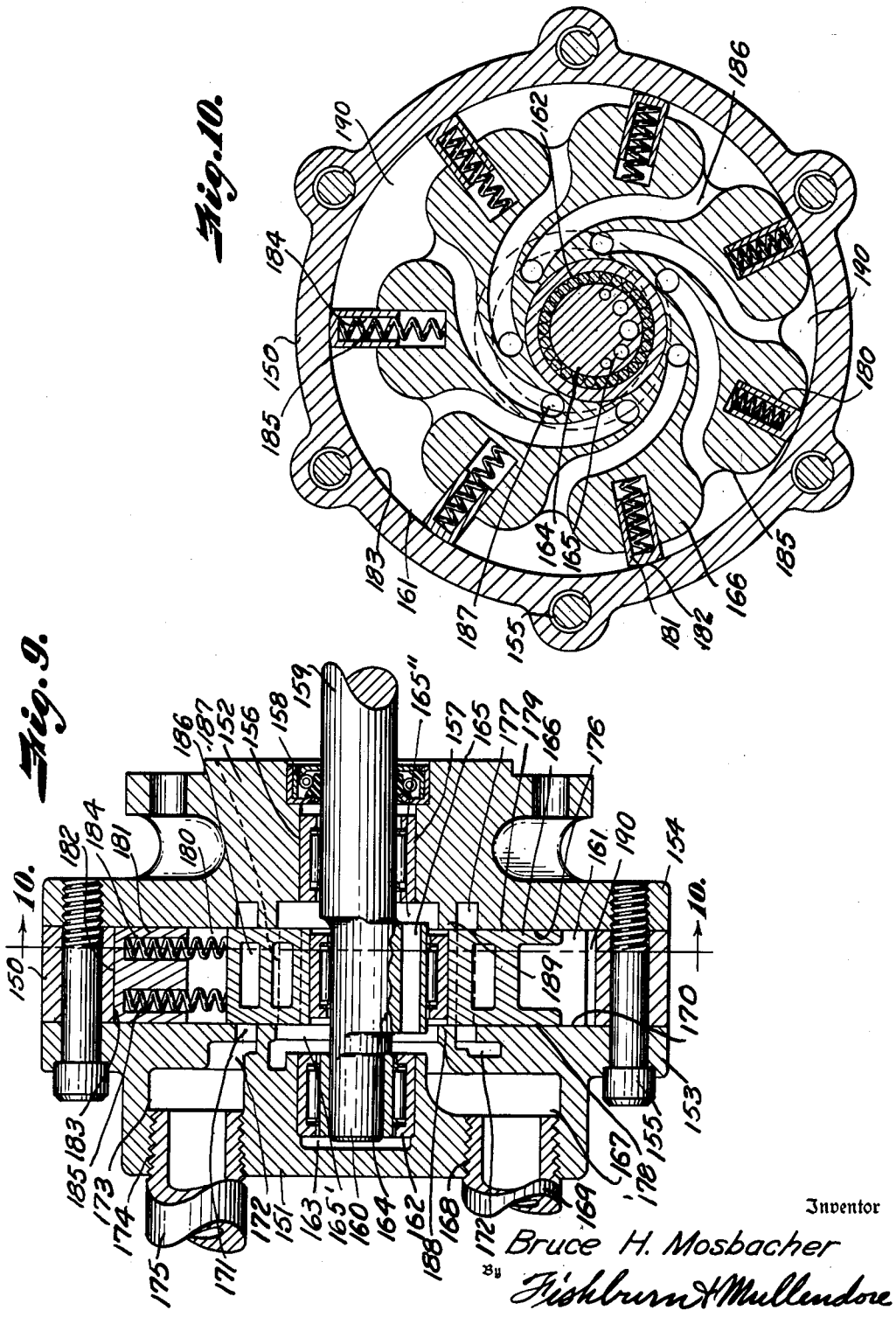
Inventor
Bruce H. Mosbacher
By Fishburn & Mullendore
Attorneys United States Patent Office 2,736,267
Patented Feb. 28, 1956

2,736,267
PUMP, MOTOR OR LIKE DEVICE
Bruce H. Mosbacher, Rockford, Ill.
Application April 29, 1950, Serial No. 159,110
34 Claims. (Cl. 103—158)

This invention relates to a pump or motor including a stator and a movable member which is adapted for pumping a fluid or to be actuated by a fluid under pressure and has for its principal object to provide a device of this character that is simple, efficient, and relatively inexpensive to manufacture.

Other objects of the invention are to provide a device which when in operation has a minimum of possible leak paths, to form such possible leak paths in a manner to maintain slippage of the fluid to a very low degree; to provide a device having a minimum of moving parts, thereby reducing friction and operating costs; to provide a device having a moving part movable in translatory fashion in a casing-like stator through an orbital path and which is directly actuated by or directly actuates a single rotary element; to provide a structure wherein the moving part produces a self-lapping action against the valving face of stator thereby maintaining seal of fluid around the intake and discharge ports at one side thereof; to provide a non-rotary leak proof seal on the opposite side of the moving part which is yieldable to permit translatory orbital movement thereof, and to provide for spring retention of the movable part to maintain seal thereof with respect to the casing-like stator and to effect a relief or pressure regulating action when an increasing fluid pressure reaches a predetermined value.

A further object of the invention is to provide a pump or fluid motor which is less subject to interference in operation caused by foreign particles contained in the fluid medium.

In accomplishing these and other objects of the invention hereinafter pointed out, I have provided improved structure, the preferred forms of which are illustrated in the accompanying drawings.

Each of the following embodiments of the present invention is characterized by a casing defining a chamber and presenting a valving face at the chamber at which are located fluid inlet and outlet ports, and fluid displacement means in the casing including an actuator which has cyclical translatory movement orbitally across the valving face to perform the dual functions of valving the fluid intake and discharge to and from the fluid displacement means and actuating the fluid displacement means in timed relation with such intake and discharge of fluid.

In the drawings:

Fig. 2 is a longitudinal section through the assembled device.

Fig. 3 is a cross section on a line 3—3, Fig. 2.

Fig. 4 is a longitudinal section through a modified form of the invention.

Fig. 5 is a cross sectional view through the device illustrated in Fig. 4, one-half of the section being taken through the flow passageways of the stator and the other half through the piston chambers, and with the movable member in a position with the eccentric advanced 90° from the eccentric position shown in Fig. 4.

Fig. 6 is a fragmentary cross section through the form of invention illustrated in Figs. 4 and 5, the section being taken on a line 6—6, Fig. 4.

Fig. 7 is a fragmentary section through a further modified form of the invention.

Fig. 8 is a longitudinal section through a pump or motor embodying a further modified form of the invention.

Fig. 9 is a longitudinal section through a pump or motor showing a still further modified form of the invention.

Fig. 10 is a cross section on the line 10—10 of the Fig. 9.

Figure 1:
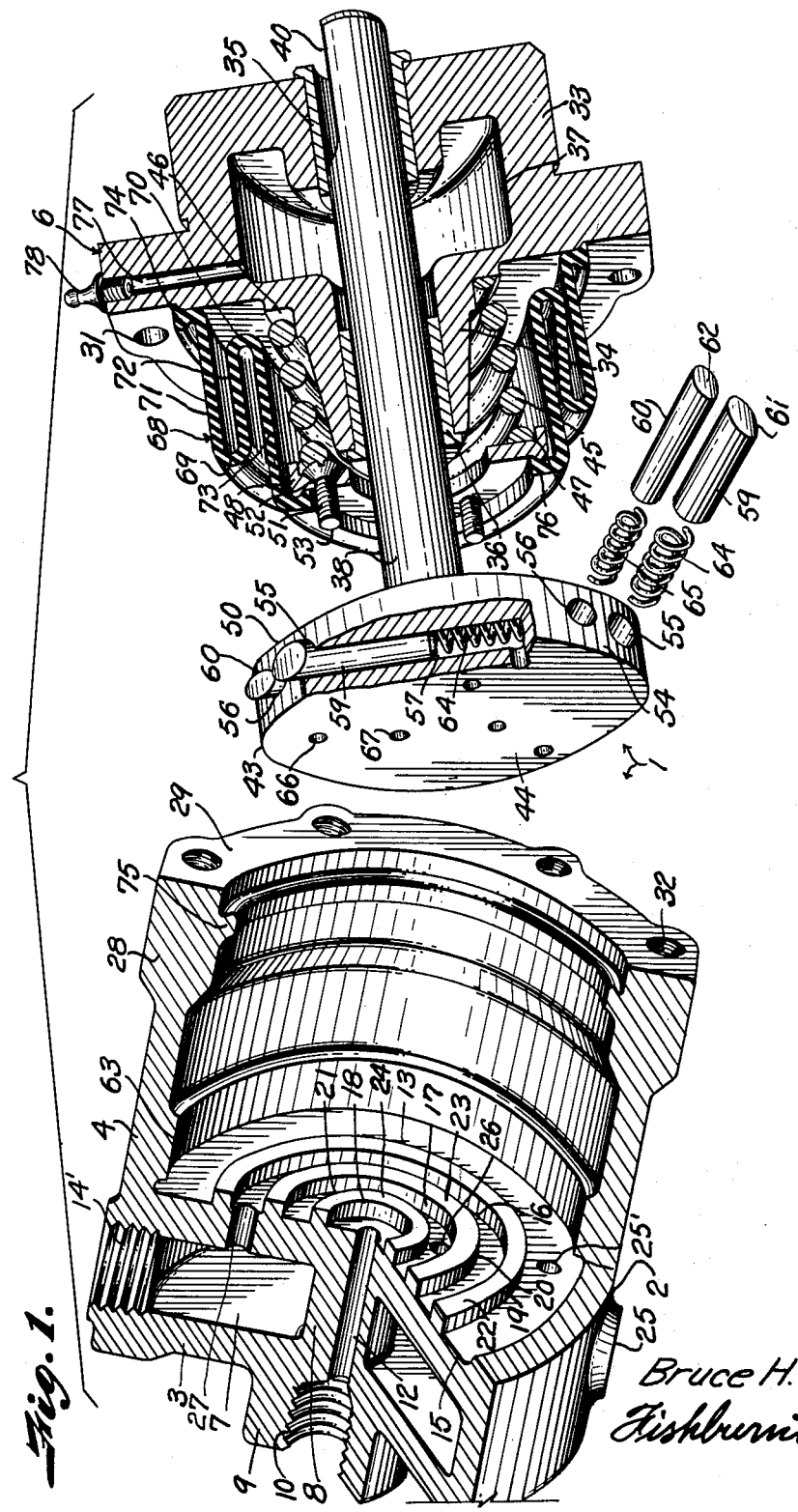
Fig. 1 is a perspective view of the parts of a device particularly constructed in accordance with the present invention to serve as a fluid pump and which parts are shown in spaced relation with portions broken away and in section to better illustrate the construction.

Referring more in detail to the drawings and first to the form of the invention illustrated in Figs. 1, 2, and 3, inclusive:

1 designates a pump constructed in accordance with the present invention and which includes a casing-like stator or housing 2 having an end wall 3 and a laterally extending annular wall 4 forming a chamber 5 closed by an end plate 6. The end wall 3 is relatively thick to accommodate an annular flow passage or reservoir 7 extending about an axial web 8 registering with an externally projecting boss 9 which is bored and internally threaded at 10 to provide a connection for a discharge pipe 11 which registers with a discharge passage 12 extending through the web 8. The particular device illustrated is a two stage type pump such as used in supplying fuel oil to a burner, the main function of the additional stage being to allow a portion of the oil with intrained oil vapor and/or air to be pumped to the flow passage or reservoir 7 where the air rises and vapors go into solution with the oil for return to the supply tank (not shown). The other portion of the oil freed of the air and vapor passes directly to the second stage for discharge to the burner (not shown). The passageway 7 is therefore provided with an internally threaded outlet 14' to which a discharge pipe 14 is connected for discharging intrained gases and excess oil to the supply tank.

Formed in the flat inner face 13 of the end wall are concentric annular passageways 15, 16, and 17 encircling an axial recess 18 which connects with the discharge passage 12. Formed between the respective passageways are annular lands 19, 20, and 21 having flat valving faces 22, 23, and 24 all located in a common transverse plane. The outer passageway 15 connects through a port 25' with an inlet 25 having internal threads for connection of a pipe 26 leading from the fluid supply (not shown). The passageways 16 and 17 are connected with the annular passageway 7 through ports 26 and 27, respectively, whereby a portion of the fluid discharged from one stage through the port 27 is admitted through the port 26 to the other stage while the remaining portion containing free air and evolved vapors is discharged through the outlet connection 14', as later described.

The opposite end of the casing-like stator terminates in a flange 28 having a seating face 29 for the closure plate 6 which is removably retained thereagainst by fastening devices, such as capscrews 30 that extend through suitable openings 31 in the plate and into threaded sockets 32 in the flange 28. The plate 6 thus closes that side of the chamber 5 and carries an outwardly projecting hub 33 cooperating with a smaller inwardly projecting hub 34 for mounting bearings 35 and 36 on the respective sides of an annular lubricant chamber 37 that is provided within a portion of the closure plate and hub 33, as best shown in Figs. 1 and 2. Rotatably mounted in the bearings 35 and 36 is a shaft 38 which is concentric with the lands 19—21 at the inner face of the casing end wall 3, as shown in Fig. 2.

The inner end of the shaft 38 is provided with an annular radially extending flange 39 that forms a stop with the bearing 36 to restrict outward axial movement of the shaft. The opposite or outer end of the shaft is suitably formed, for example, by flattening a side thereof as indicated at 40 to connect a driving element (not shown) such as a gear, pulley, or the like. Formed on the inner end of the shaft is an eccentric connection in the form of a pintle 41 which engages within an axial bearing 42 of an actuator in the form of an orbital member 43 that is of smaller diameter than the chamber 5 to permit translatory movement of the orbital member 43 orbitally about the axis of shaft 38 in response to rotation of the shaft 38 when the pump is in operation.

The orbital member 43 has a flat end face 44 that is yieldingly retained in sealing contact with the valving faces of the respective lands by means of a coil spring 45 which encircles the inner hub 34 and has one end engaging an annular spring seat 46 provided on the inner side of the end plate 6 as best shown in Fig. 2.

The opposite end of the spring 45 engages in a spring seat 47 provided within a clamping ring 48 attached to an axial boss 49 on the other end face 50 of the orbital member 43, the clamping ring being secured by fastening devices such as screws 51 that extend through suitable openings 52 in the ring and into threaded sockets 53 of the orbital member. The orbital member is thus retained in yielding contact with the valving faces of the lands to prevent leakage from one passageway to another under pressure differentials, the spring 45 determining the maximum discharge pressure of the pump and automatically providing relief when the discharged pressure exceeds the pressure exerted by the spring.

Extending inwardly from the peripheral face 54 of the orbital member 43 are pairs of bores 55 and 56 with the bores of each pair arranged in spaced parallel relation and with their axes extending on substantially parallel chords of a circle of which the peripheral face of the orbital member is the circumference. The bores terminate short of the opposite side of the orbital member to provide closed ends for variable volume piston chambers 57 and 58.

Slidably mounted within the bores 55 and 56 are pistons 59 and 60 having ends 61 and 62 thereof engaging an annular track 63 that is formed on the inner side of the casing wall 4, as best shown in Figs. 1 and 2. The pistons are retained in contact with the face of the track by coil springs 64 and 65 having one end seated against the bottoms of the bores 55 and 56 and their outer ends bearing against the inner ends of the pistons 59 and 60, as shown in Fig. 3. Formed in the orbital member 43 in communication with the respective piston chambers 57 and 58 are lateral ports 66 and 67 through which fluid is admitted to and discharged from the piston chambers upon reciprocatory movement of the pistons 59 and 60 in response to rotation of the shaft 38, the ports being arranged relatively to the passageways 15, 16, and 17 so that when the orbital member is moved in translatory fashion through its orbital path they shift across the lands between high and low pressure passageways.

In order to prevent leakage of the fluid out of the stator chamber 5, a flexible sealing element 68 is provided in the form of a bellows having folds 69 and 70 connecting annular portions 71, 72, and 73, as shown in Fig. 2. The outer annular portion 71 terminates in a flange 74 that is clamped between the end plate 6 and an inset annular rib 75 on the flange of the wall portion of the casing. The inner annular portion 73 of the bellows terminates in an inwardly extending flange 76 that is engaged between the clamping ring 48 and inner face of the orbital member. The lubricant space may be filled with a suitable lubricant through a port 77 to which is connected a pressure fitting 78.

In operating the pump constructed and assembled as illustrated in Figs. 1 to 3 inclusive, the inlet 25 and the connection 14' are connected with the supply tank by the pipes 26 and 14, respectively, to supply fluid to the pump and to return excess fluid and vapor to the source of supply. The outlet connection 10 is connected by the pipe 11 with the oil burner (not shown). The shaft 38 is connected with a suitable motor or other prime mover by which the shaft may be rotated.

Upon rotation of the shaft 38, the pintle 41 on the end thereof gyrates about the axis of the shaft and effects orbital translatory movement of the orbital member to effect reciprocation of the pistons within the piston chambers in proper coordination with the intake and discharge of fluid to and from these piston chambers. When the pistons are in retracted position within the bores the ports 66 and 67 are registering respectively with the supply passage 15 and the annular passage 17, so that upon further movement of the orbital member 43 the springs 64 and 65 expand to move the pistons outwardly and thereby draw charges into the piston chambers 57 and 58. Further movement of the orbital member 43 effects shifting of the ports 66 and 67 across the valving faces of the lands, so that when the pistons are again shifted inwardly against the action of the springs the fluid in the piston chambers is ready to be discharged as soon as the ports 66, 67 are uncovered on the inner sides of the lands and are in registration with the passage 16 and recess 18 respectively, whereby the fluid from the outer piston chambers 57 is discharged into the annular passage 7 and the liquid from the inner piston chambers 56 is discharged under pressure through the recess 18, outlet passage 12, and pipe 11 to the burner. As the orbital member 43 continues to move in translatory fashion in its orbital path slidably across the lands 19—21 at the inner side of the housing end wall 3, each pair of pistons is successively effective in drawing in and discharging the fluid. Thus, the actuator or orbital member 43, the pistons 59, 60 reciprocably mounted in the actuator, and the annular track 63 on the housing cooperate to provide fluid displacement means which vary the respective volumes of the piston chambers 57, 58 in response to the cyclical translatory movement of the actuator or orbital member 43 to thereby effect the desired fluid pumping action. At the same time, the actuator or orbital member 43, by its translatory movement sliding across the lands 19—21 at the flat end wall 13 on the housing, performs the additional function of valving the fluid intake and discharge to and from these variable volume fluid displacement chambers in the proper timed relationship with the described pumping action. The fluid discharged from the first stage into the passage 7 is at a relatively low pressure, for example, close to atmospheric pressure, and since a below atmosphere pressure was established on the fluid under the suction stroke of the pistons entrained air and vapors are separated from the liquid when discharged into the passage 7, wherein excess liquid containing the air bubbles and released vapor rises to the top of the passage 7 and is returned to the source of supply through the outlet 14' and pipe 14. The remaining or heavy portion of the oil is admitted through the ports 26 and passage 17 to the ports 67 of the inner piston chambers to be expelled by the second stage pistons through ports 67, recess 18, passage 12, and pipe 11 under high pressure to the burner as previously described.

It is obvious that the orbital member is prevented from turning during its orbital movement through drag of the pistons on the track 63 which is supplemented by anchorage of the flexible sealing element. The sealing element however is sufficiently flexible to permit the desired orbital movement of the orbital member.

It is obvious that the seating face of the orbital member may wear upon the valving faces of the lands; however, the face of the orbital member and faces of the lands are automatically lapped together to maintain a substantially perfect seal under action of the spring 45. Attention is also directed to the fact that the resilient pressure of the spring 45 permits the orbital member to act as a relief valve for relieving excess pressure differentials in the discharge recess 18. When the orbital member is unseated the fluid under excess pressure escapes through the inlet passages until the pressure drops below the effective pressure of the spring, whereupon the spring becomes effective to again reseat the orbital member and the pump operates as described.

The form of the invention illustrated in Figs. 4, 5, and 6 includes a stator or housing 80 composed of a cylindrical block 81 provided with radially disposed piston chambers 82 having their outer ends closed by plugs 83 and their inner ends opening into a substantially cylindrical chamber 84 which houses an orbital actuator 85 as later described. The block 81 also includes a plurality of passageways 86 connecting the piston chambers 82 with ports 87 opening into the chamber 84 through a flat valving face 88, the ports being arranged in circular series about the axis of an operating shaft 89.

The stator also includes a closure 90 for the side of the chamber 84 opposite the valving face as best shown in Fig. 4. The closure 90 includes a substantially disc like body 91 having concentric inlet and outlet passageways 92 and 93 in communication with the chamber 84 through ports 94 and 95 and which open through a flat valving face 96 opposite the valving face 88. The disc like body portion 91 is provided with internally threaded openings 97 and 98 that are respectively connected with the inlet and outlet passageways 92 and 93 for attaching supply and discharge pipes 99 and 100. The closure has an annular flange 101 through which fastening devices 102 are extended to secure the closure to the member 81 of the stator.

Formed coaxially within the stator are bearing openings 103 and 104 for mounting anti-friction bearings or the like 105 and 106 which journal the shaft 89. The shaft 89 has one end 107 that projects from the stator for mounting a driving member such as a pulley, gear, or the like (not shown). The shaft is sealed about the periphery thereof by a sealing ring 108 that is secured in position by a retaining ring 109 that is attached to the stator by fastening devices 110 as shown in Fig. 4. The bearing opening at the opposite end of the shaft is closed by a plug 111 which is threaded into the open end of the bearing opening and which mounts a pipe 112 by which any leakage within the pump is returned to the source of supply. The orbital member 85 comprises a circular disc like body 113 having an axial opening 114 for accommodating an eccentric 115 on the shaft 89 and which, when the shaft is rotated, causes the orbital member to move in a fixed orbit within the chamber 84 in translatory fashion orbitally about the axis of the shaft, the orbital member being preferably mounted on the eccentric by an anti-friction bearing 116. The orbital member has end faces 117 and 118, and formed therein are concentric annular passages 119 and 120 which are inter-connected by a circular series of openings 121 extending transversely through the orbital member as shown in Fig. 4. The passageways 119 and 120 thus form annular lands 122 and 123 on the respective sides thereof. The land 123 valves the ports 87 to control the flow of fluid to and from the piston chambers. Slidable within the piston chambers and having contact with the periphery of the orbital member are pistons 124 that are yieldingly retained in operative contact with the orbital member by springs 125 having one end bearing against the plugs 83 and their opposite ends against the bottoms 126 of axial sockets 127 that are formed in the pistons. The operation of a pump as illustrated in Figs. 4, 5, and 6 is as follows:

When the shaft 89 is rotated to effect gyration of the eccentric 115, the orbital member is caused to move in translatory fashion in an orbital path within the chamber 84 and effect reciprocation of the pistons within their respective cylinders. When the pistons move inwardly under action of the springs, a charge of fluid is drawn into the piston chambers from the inlet pipe 99, passageway 92, and ports 94 into the chamber 84 around the periphery of the orbital member and through the ports 87 and passageways 86 into the piston chambers 82. As the shaft continues to rotate and the orbital member continues its movement, the lands 123 move across the ports 87 so that the ports 87 connect with the passageway 120, holes 121, passageway 119, ports 95, and passageway 93 with the discharge pipe 100. During this movement, the pistons move outwardly against action of the springs 125 and discharge fluid under pressure through the pipe 100. Thus, in this embodiment, also, the actuator or orbital member 85 by its translatory movement performs the dual functions of actuating the fluid displacement means to pump fluid and valving the intake and discharge of the fluid. In order to balance the pressures on the respective sides of the orbital member, the ports 94 and 87 are offset on opposite sides of the chamber 84 with recesses 128 and 129 in which fluid is trapped when the valving faces of the orbital member is closing the respective ports. The ports 95 are also offset with recesses 95' at the opposite side of chamber 84 for the same purpose.

The form of the invention shown in Fig. 8 substantially follows the modification shown in Figs. 4 to 6 inclusive (the same reference numerals being used for corresponding elements), with the exception that the pistons 130 are actuated by rods 131 having ball ends 132 adapted to swivel within sockets 133 of the pistons. The opposite ends of the rods have somewhat similar ends 134 swivelled in sockets 135 formed in the periphery of the orbital member. The working pressure subjected to the head area of the piston holds the piston tight against the ball end of the connecting rod to establish a seal and the total fluid pressure acting on the piston and connecting rod end is substantially balanced by fluid pressure acting on the opposite end of the rod by way of a bore 136 formed longitudinally of the rod. Contact of the piston rods with the juncture of the piston chambers with the orbital chamber prevents rotation of the orbital member on the eccentric which drives it.

In this form of the invention the low pressure inlet ports communicate with the annular passageways when the inner land uncovers the inlet ports and the fluid is drawn into the piston chambers. As the orbital members continue their movement, the lands again valve off the inlet ports and connect the discharge ports with the cylinder chambers so that outward movement of the pistons discharge the fluid under pressure through the outlet ports similar to the operation described in connection with the modification just described. The fluid is transferred from the port 95 through a hole 121' in the eccentric part of the shaft 115 to the space 84' which supplies fluid to the ports 87.

The leakage is returned from the chamber 84 circumferentially of the orbital member through a duct 137 that is connected by a pipe 138 with the source of fluid supply. It is obvious in this form of the invention the inlet fluid provides lubricant for the shaft bearings as well as the bearings mounting the orbital member on the eccentric of the shaft.

In the form of the invention shown in Figs. 4, 5, and 6 the pistons drag on the periphery of the orbital member. This opposition is overcome in the form of the invention shown in Fig. 7. In this form, double piston chambers 139 are provided within the stator for mounting pistons 141 having cone shaped ends 143 that engage annular bevelled tracks 145 that are provided on the periphery of the orbital member. It is thus obvious that when the orbital member is actuated within the stator, the tracks cause the pistons to rotate thus relieving the drag of the pistons on the orbital member. In this form of the invention, the springs 147 holding the pistons against their tracks are seated upon balls 148 which allow the pistons to turn freely under the force of the springs; otherwise, the construction is the same as that disclosed in connection with the form of the invention illustrated in Figs. 4, 5, and 6. The piston chambers are closed at their outer ends by plugs 149.

The form of the invention illustrated in Figs. 9 and 10 includes a ring shaped body 150 closed at the sides by end plates or heads 151 and 152 having annular flanges 153 and 154 seating against the side faces of the ring and attached by fastening devices 155. The head 152 has an axial bore 156 to receive a shaft bearing 157. The bore 156 is counter-bored to receive a sealing element 158 to prevent leakage around an operating shaft 159. The shaft has a reduced end 160 extending through the chamber 161 of the device and which is journalled in a bearing 162 that is mounted in a recess 163 formed on the inner side of the head 151. Formed on the reduced portion of the shaft within the chamber 161 is an eccentric 164 having passages 165 extending therethrough to transfer fluid from a passage 165' at one side to a passage 165" at the other. Fluid is admitted to the passage 165' of the stator through an inlet passage 167 that is connected with an internally threaded opening 168 for connecting a supply pipe 169.

Formed in the valving face 170 of the head 151 is a circular passage 171 that connects with an annular passageway 172 by which fluid is discharged under pressure through an outlet 173 having terminal threads 174 for connecting a discharge pipe 175. The opposite face 176 of the chamber 161 has an annular passage 177 that registers with the ports 171 for balancing pressures on the respective sides of the orbital member 166. The orbital member 166 includes a substantially circular body having flat end faces 178 and 179 corresponding with the end faces 170 and 176 of the chamber 161.

The periphery of the orbital member is provided with circumferentially spaced radial sockets or slots 180 that extend thereacross and in which are reciprocally mounted vanes 181 having outer edges 182 in contact with the inner peripheral face 183 of the chamber 161, the opposite edge of the blade having inwardly extending bores 184 for containing coil springs 185 having one of their ends bearing against the bottom of the sockets and their opposite ends bearing against the ends of the bores 184 so as to retain the vanes in contact with the circumferential face 183 of the chamber 161 when the shaft is rotated to effect orbital motion of the orbital member. The portions of the orbital member intermediate the vanes 181 may be provided with transverse grooves 185 which connect with passagesways 186 leading to lateral ports 187 which are adapted to be valved by the lands 188 and 189 and to connect the passageways 186 with the inlet and discharge passages when the orbital member is actuated and in the same manner as the orbital members in the devices previously described.

In this form of the invention the variable volume pressure chambers 190 are formed between the vanes, the periphery of the orbital member, and the inner face 183 as best shown in Fig. 10. If the device is operated as a pump, the shaft 159 is connected with a suitable prime mover to effect gyration of the eccentric 164 and orbital translatory movement of the orbital member 166. As the orbital member is actuated in a clockwise direction, Fig. 10, the pressure chambers 190 gradually increase from their minimum capacity at the lower portion of the chamber 161 to their maximum capacity at the upper portion of the chamber 161 so that fluid to be pumped is drawn from the inlet 167 when the ports 187 connect with the inlet passages 165' and 165" at the sides of the orbital member. As the orbital member continues to move, the ports 187 are carried outwardly across the lands 188 and 189 and as the orbital member continues to operate, the ports 187 connect with the discharge passages 171 and 172 to effect discharge of the fluid under pressure. If the device is operated as a fluid motor, a fluid under pressure is delivered through the pipe 175 which, when the ports 187 are uncovered, flows into the chambers 190 through the passages 186 and acts between the vanes 181 to effect movement of the orbital member in the direction of expansion of the pressure chambers, the fluid being discharged as the pressure chambers decrease in capacity.

From the foregoing, it is obvious that I have provided a pump or motor device that is of simple, efficient construction and which is relatively inexpensive to manufacture. It is also obvious that possible leak paths have been reduced to a minimum and so formed that slippage of fluid has been reduced to a very low amount. I have provided a device having a minimum of moving parts, thereby reducing friction and operating costs as well as providing a device which is less subject to interference in operation caused by foreign particles contained in the fluid medium.

While there have been described herein and illustrated in the accompanying drawing certain preferred embodiments of the present invention, it is to be understood that various modifications, omissions and refinements which depart from the disclosed embodiments may be adopted without departing from the spirit and scope of this invention.

What I claim and desire to secure by Letters Patent is:

1. A pump or fluid motor comprising a housing defining a chamber and carrying a wall which presents a flat face extending across one end of said housing chamber and at which are located inlet and outlet ports, fluid displacement means in said housing cooperating with said housing to provide a fluid displacement chamber of variable volume and including an actuator in said housing chamber mounted for cyclical translatory relative movement across said flat housing face to vary cyclically the volume of said fluid displacement chamber and of smaller size than said housing chamber in the direction of said translatory relative movement between the actuator and the housing, said actuator abutting against said flat housing face and selectively controlling the flow of fluid between said fluid displacement chamber and said inlet and outlet ports in the relative translatory movement between the actatuor and the housing to cyclically pass fluid to said fluid displacement chamber from said inlet port and discharge fluid from said fluid displacement chamber to said outlet port as the volume of said fluid displacement chamber is varied cyclically by the relative translatory movement between the actuator and the housing.

2. A pump comprising a housing containing a chamber and carrying a wall which presents a face extending across one end of said chamber at which are located inlet and outlet ports, fluid displacement means in said housing including an actuator mounted for cyclical translatory movement in said housing chamber across said housing face and of smaller size than said housing chamber in the direction of its movement therein, means on the actuator cooperating between the housing and the actuator to establish within the housing a variable volume fluid displacement chamber whose volume is varied in the translatory movement of the actuator, said actuator abutting against said housing face and controlling the fluid communication between said inlet and outlet ports and said fluid displacement chamber to cyclically pass fluid from said inlet port to said fluid displacement chamber and discharge fluid from said fluid displacement chamber to said outlet port in the translatory movement of the actuator, and drive means having a driving connection to the actuator to move the actuator cyclically in translatory fashion orbitally about an axis in said housing chamber extending transverse to said housing wall.

3. A pump comprising a housing containing a chamber and carrying a wall which presents a flat face extending across one end of said chamber at which are located inlet and outlet ports, fluid displacement means in said housing including an actuator mounted for cyclical translatory movement in said housing chamber across said housing face and of smaller size than said housing chamber in the direction of its movement therein, means on the actuator cooperating with the housing and the actuator to establish within the housing a variable volume fluid displacement chamber whose volume is varied in the translatory movement of the actuator, said actuator abutting against said flat housing face and controlling the fluid communication between said inlet and outlet ports and said fluid displacement chamber to cyclically pass fluid from said inlet port to said fluid displacement chamber and discharge fluid from said fluid displacement chamber to said outlet port in the translatory movement of the actuator, and drive means having a driving connection to the actuator to move the actuator cyclically in translatory fashion orbitally about an axis in said housing chamber extending perpendicular to said housing face.

4. A pump or fluid motor comprising a stator defining a chamber and formed with a flat face extending across one end of said chamber at which are located separate inlet and outlet passages, fluid displacement means within said stator cooperating with said stator to provide a plurality of fluid displacement chambers of variable volume and including an actuator disposed within said stator chamber and movable in bodily translatory fashion orbitally relative to the stator to vary cyclically the respective volumes of said fluid displacement chambers, and said actuator being formed with a flat face abutting against said flat stator face and formed with a plurality of passages controlling communication with said fluid displacement chambers and terminating in ports at said flat face on the actuator, said actuator in its orbital movement relative to the stator sliding its flat face across the abutting flat face of the stator to shift the ports at said flat actuator face across said flat stator face to selectively control the flow of fluid between the stator inlet and outlet passages and said fluid displacement chambers in timed relation with the cyclic variation of the respective volumes of said fluid displacement chambers.

5. A pump comprising a housing containing a chamber and carrying a wall which presents a face extending across one end of said housing chamber at which are located inlet and outlet ports, fluid displacement means in said housing including an actuator mounted for cyclical translatory movement in said housing chamber across said housing face and of smaller size than said housing chamber in the direction in which it moves therein, means between the actuator and the housing coacting with the actuator and the housing to establish a plurality of variable volume fluid displacement chambers within the housing whose respective volumes are varied cyclically in the translatory movement of the actuator, said actuator abutting against said housing face and controlling the fluid communication between said inlet and outlet ports and the fluid displacement chambers to pass fluid to and from said fluid displacement chambers in timed relation with the cyclic variation of the volumes of the fluid displacement chambers in the translatory movement of the actuator, a rotary drive shaft extending into the housing transverse to said housing face, and an eccentric driving connection from the drive shaft to the actuator to impart cyclical translatory movement to the actuator orbitally about the axis of the shaft in response to rotation of the shaft.

6. A pump comprising a housing containing a chamber and carrying a wall which presents a face extending across one end of said chamber at which are located inlet and outlet port means, fluid displacement means in said housing including an actuator mounted for cyclical translatory movement in said housing chamber across said housing face and of smaller size than said housing chamber in the direction of its movement therein, means on the actuator acting between the housing and the actuator to establish within the housing a plurality of variable volume fluid displacement chambers whose respective volumes are varied cyclically in the translatory movement of the actuator, said actuator abutting against said housing face and controlling the fluid communication between said inlet and outlet port means and said fluid displacement chambers to cyclically pass fluid from said inlet port means to said fluid displacement chambers and discharge fluid from said fluid displacement chambers to said outlet port means in the translatory movement of the actuator, and drive means having a driving connection to the actuator to move the actuator cyclically in translatory fashion orbitally about an axis in said housing chamber extending transverse to said housing wall.

7. A pump comprising a housing containing a chamber and carrying a wall which presents a face extending across one end of said housing chamber at which are located inlet and outlet ports, fluid displacement means in said housing including an actuator mounted for cyclical translatory movement in said housing chamber across said housing face and of smaller size than said housing chamber in the direction in which it moves therein, means on the actuator cooperating with the housing and the actuator to establish a plurality of variable volume fluid displacement chambers within the housing whose respective volumes are varied cyclically in the translatory movement of the actuator, said actuator abutting against said housing face and in its translatory movement cyclically establishing fluid communication between said inlet and outlet ports and said fluid displacement chambers to pass fluid to and from said fluid displacement chambers in timed relation with the cyclic variation of the volumes of the fluid displacement chambers, a rotary drive shaft extending into the housing, and an eccentric driving connection from the drive shaft to the actuator to impart cyclical translatory movement to the actuator orbitally about the axis of the shaft in response to rotation of the shaft.

8. A pump or fluid motor comprising a housing defining a chamber and carrying a wall which presents a flat face extending across one end of said housing chamber at which are located inlet and outlet ports, fluid displacement means in said housing chamber cooperating with the housing to provide a plurality of fluid displacement chambers of variable volume, said fluid displacement means including an actuator in said housing chamber mounted for cyclical translatory relative movement therewith across said housing face and of smaller size than said housing chamber in the direction of its relative movement therein, said fluid displacement means also including a plurality of reciprocatory elements each forming part of a respective one of said variable volume fluid displacement chambers and acting between the actuator and the housing so that the volumes of the respective fluid displacement chambers are varied cyclically in said translatory relative movement between the actuator and the housing, said actuator having a flat face which engages said flat housing face and said actuator having a plurality of passages for communication with said fluid displacement chambers which terminate at said flat actuator face, and means for effecting translatory relative movement between the actuator and the housing to effect relative sliding of said flat actuator face across flat housing face for cyclically establishing communication between the inlet and outlet ports at said housing face and the fluid displacement chambers to pass fluid to said fluid displacement chambers and discharge fluid therefrom in timed relation with the cyclic variation of the volumes of the respective fluid displacement chambers.

9. The device of claim 8, wherein said variable volume fluid displacement chambers are defined by the actuator and the respective reciprocatory elements, the reciprocatory elements at their respective outer ends engage the housing, and the reciprocatory elements have relative reciprocation with respect to the actuator in said translatory relative movement between the actuator and the housing to vary the volumes of the respective fluid displacement chambers.

10. The device of claim 8, wherein said variable volume fluid displacement chambers are defined by the housing and the respective reciprocatory elements, the reciprocatory elements at their respective inner ends engage the actuator, and the reciprocatory elements have relative reciprocation with respect to the housing in said translatory relative movement between the actuator and the housing to vary the volumes of the respective fluid displacement chambers.

11. The device of claim 8, wherein said variable volume fluid displacement chambers are defined by the housing, the actuator and the respective reciprocatory elements, the reciprocatory elements at their outer ends engage the housing, and the reciprocatory elements are carried by the actuator and have relative reciprocation with respect thereto in said translatory relative movement between the housing and the actuator.

12. A pump or fluid motor comprising a housing defining a chamber and having a flat face extending across one end of said chamber at which are located separate inlet and outlet passages, fluid displacement means disposed within said housing cooperating with said housing to establish a plurality of fluid displacement chambers of variable volume, said fluid displacement means including an actuator mounted in said housing chamber for translatory movement cyclically across said flat housing face and of smaller size than said housing chamber in the direction of its movement therein, said actuator having a flat face abutting against said flat housing face and formed with a plurality of passages leading to said fluid displacement chambers and terminating at said flat face on the actuator, said actuator upon said translatory movement within said housing chamber sliding its flat face across the abutting flat housing face to shift the actuator passages cyclically into and out of registration with the housing inlet and outlet passages to establish fluid communication alternately between each said fluid displacement chamber and said housing inlet and outlet passages through said actuator passages and varying cyclically in succession the respective volumes of said fluid displacement chambers to alternately draw fluid thereinto from said housing inlet passage and discharge fluid therefrom to said housing outlet passage.

13. A pump or fluid motor comprising a housing formed with a chamber and having a wall which presents a flat face extending transversely across one end of said chamber at which are located separate inlet and outlet passages, fluid displacement means in said housing cooperating with said housing to provide a plurality of fluid displacement chambers of variable volume and including an actuator within said housing chamber, said actuator being mounted for bodily translatory movement orbitally within said housing chamber across said flat housing face to vary cyclically the respective volumes of said fluid displacement chambers said actuator having a flat face which abuts against said flat housing face and said actuator being formed with a plurality of passages terminating at said actuator face and controlling fluid communication with said fluid displacement chambers, and said fluid displacement means also including a plurality of slidable elements which define in part said fluid displacement chambers and which act between the actuator and the housing so that the respective volumes of said fluid displacement chambers are varied cyclically in the translatory movement of the actuator within the housing chamber, said actuator upon translatory movement within the housing chamber sliding its flat face across the abutting flat housing face to shift said actuator passages relative thereto and to establish communication cyclically between the housing inlet and outlet passages and each of said fluid displacement chambers in timed relation with the cyclic variation of the volumes of the respective fluid displacement chambers in the translatory movement of the actuator.

14. A pump comprising a housing containing a chamber and carrying a wall which presents a flat face extending across one end of said housing chamber at which are located inlet and outlet ports, fluid displacement means in said housing including an actuator mounted for cyclical translatory movement in said housing chamber parallel to said flat housing face and of smaller size than said housing chamber in the direction in which it moves therein, means on the actuator coacting between the housing and the actuator to establish within the housing a plurality of variable volume fluid displacement chambers whose respective volumes are varied cyclically in the translatory movement of the actuator, said actuator having a flat face which abuts against said flat housing face, said actuator being formed with a plurality of passages communicating respectively with said fluid displacement chambers and terminating at said actuator face to register cyclically with said inlet and outlet ports in the abutting housing face in the translatory movement of the actuator to pass fluid to and from said fluid displacement chambers in timed relation with the cyclic variation of the volume of the fluid displacement chambers, a rotary drive shaft extending into the housing in a direction perpendicular to said flat housing face, and an eccentric driving connection from the drive shaft to the actuator to impart cyclical translatory movement to the actuator orbitally about the axis of the shaft in response to rotation of the shaft.

15. A pump comprising a housing defining a cylindrical chamber and formed with a wall which presents a flat face extending across one end of said housing chamber at which are located inlet and outlet ports, a cylindrical actuator mounted within said housing chamber for cyclical translatory movement therein across said flat housing face, said actuator being smaller than said housing chamber in the direction of its movement therein, a rotary drive shaft extending into said housing and having an eccentric connection to the actuator to move the actuator cyclically in translatory fashion orbitally about the axis of the shaft in response to the rotation of the shaft, said actuator being formed with a plurality of bores extending inward from the periphery of the actuator, reciprocatory pistons slidably mounted in the outer ends of said bores, springs in said bores biasing the respective pistons outward into engagement with the cylindrical housing chamber wall, said actuator having a flat face abutting against said flat housing face, and said actuator being formed with a plurality of passages communicating with said bores and terminating at ports in said flat actuator face which register cyclically with said inlet and outlet ports in the flat housing face in the translatory movement of the actuator to pass fluid to and from said bores as said pistons have relative reciprocation with respect to said bores to pump fluid in the bores in the translatory movement of the actuator.

16. A device of the character described including a stator member having an internal chamber, an actuator member mounted for orbital bodily translatory motion within said chamber, one of said members having a socket communicating with said chamber, a rotary element having support in said stator member, an eccentric driving connection between the rotary element and the orbital member to effect bodily translatory movement of the orbital member in an orbital path about said rotary element when the rotary element is actuated, a reciprocatory element slidably mounted in said socket of said one member and having an operative engagement with the other member to reciprocate in response to orbital movement of said actuator member and cooperating with one of said members for forming a pressure chamber of variable volume, one of said members having a port in connection with the pressure chamber and, said other member having a valving face for valving said port and provided with spaced passages for controlling admission and discharge of fluid to and from said pressure chamber when the actuator member is in motion, means for supplying fluid to one passage, and separate means for discharging fluid from the other passage, and a flexible seal connecting the members to prevent loss of fluid around said rotary element.

17. A device of the character described including a stator member having an internal chamber, an orbital member in said chamber, one of said members having sockets extending from said chamber, a rotary element having support in said stator member, an eccentric driving connection between the rotary element and the orbital member to effect bodily translatory movement of said orbital member in an orbital path, reciprocatory elements slidably mounted in the sockets of said one member and having operative contact with the other member to reciprocate in response to the orbital movement of said orbital member and cooperating with one of said members for forming separate high and low stage pressure chambers, one of said members being provided with separate ports in connection with the high and low stage pressure chambers respectively and arranged in inner and outer circular series concentric of said member and the other member having annular valving faces concentric with the axis of said other member for respectively valving the inner and outer series of ports to control admission and discharge of fluid to and from said chambers when the orbital member is in motion, and means for supplying and discharging fluid to and from the respective series of ports.

18. A device of the character described including a stator member having an internal chamber, an orbital member in said chamber, bores extending inwardly of the orbital member from the periphery thereof, a driving element having rotary support in the stator member, an eccentric driving connection between the driving element and the orbital member to effect bodily translatory orbital movement of the orbital member, and pistons slidable in said bores and having operative contact with the stator member to reciprocate in said bores in response to the orbital movement of said orbital member for drawing in a fluid into said bores and for discharging the fluid from said bores under pressure, said stator member having separate ports for discharging and supplying fluid to the bores, said orbital member forming a valve intermediate said supply and discharge ports and the bores for controlling the flow of fluid to and from the bores.

19. A device of the character described including a stator member having an internal chamber, an orbital member in said chamber, bores extending inwardly of the orbital member from the periphery thereof, a driving element having rotary support in the stator member, an eccentric driving connection between the driving element and the orbital member to effect bodily translatory orbital movement of the orbital member within said chamber when the driving element is actuated, pistons slidable in said bores and having operative contact with the stator member to reciprocate in said bores in response to the orbital movement of said orbital member for drawing in fluid and for discharging the fluid from said bores, said orbital member having passages in connection with the bores which terminates at a face on the orbital member in a circular series of ports concentric of said orbital member, and the stator member having an annular valving face concentric with the axis of said stator member, said face on the orbital member abutting yieldingly against said valving face on the stator member for valving said ports, said stator member having annular passages for discharging and supplying the fluid, and a flexible seal connecting the orbital member with the stator member.

20. A device of the character described including a stator member having an internal chamber, an orbital member in said chamber, bores extending inwardly of the orbital member from the periphery thereof, a driving element having rotary support in the stator member, an eccentric driving connection between the driving element and the orbital member operative to effect bodily translatory orbital movement of the orbital member within said chamber when the driving element is actuated, pistons slidable in said bores and having operative connection with the stator member to reciprocate in said bores when the orbital member is actuated for drawing in a fluid into said bores and for discharging the fluid from said bores under pressure, said orbital member having passages in connection with the bores and terminating at a flat face on the orbital member in a circular series of ports concentric of said orbital member, the stator member having an annular flat valving face concentric with the axis of said stator member for valving said ports, said stator member having means on the respective inner and outer sides of the valving face for discharging and supplying the fluid, a spring in the chamber of said stator member and bearing against the orbital member to urge said flat face on the orbital member into contact with said valving face on the stator member, a flexible seal connecting the orbital member with the stator member, and means for supplying a lubricant to said driving element and the eccentric driving connection.

21. A device of the character described comprising a casing having an annular wall and an end wall forming a chamber open at one side of said end wall, said end wall having a flat valving face formed with concentric annular passages, an orbital member in said chamber having a flat face abuttingly engaging the valving face and adapted for closing the passages therein and having piston chambers extending inwardly from the periphery of said orbital member, a closure spaced from said end wall at said one side thereof and closing said chamber, a rotary member journaled in said closure coaxially of the passages, an eccentric driving connection between the rotary member and the orbital member to effect bodily translatory movement of the orbital member in an orbital path sliding over the valving face, pistons slidable in said piston chambers and having engagement with the casing to reciprocate in said piston chambers in response to the orbital movement of the orbital member, said orbital member having lateral passages communicating with the piston chambers and terminating at said flat face on the orbital member in an annular series of ports arranged concentric of the orbital member and in position to communicate selectively with the passages in the valving face for the admission and discharge of fluid to and from said piston chambers when the orbital member is moved, and separate means for connecting the annular passages in the valving face with a source of fluid supply and discharge.

22. A device of the character described comprising a casing having an annular wall and an end wall forming a chamber open at one side of said end wall, said end wall having a flat valving face formed with concentric annular passages, an orbital member in said chamber having a flat face engaging the valving face and adapted for closing the passages therein and having piston chambers extending inwardly from the periphery of said orbital member, a closure member spaced from said end wall at said one side thereof and closing said casing chamber, a shaft journaled in said closure member coaxially of the passages in the valving face, an eccentric driving connection between the shaft and the orbital member to effect bodily translatory movement of the orbital member in an orbital path slidably over the valving face, pistons slidable in said piston chambers and having operative contact with the casing to reciprocate in response to the orbital movement of the orbital member, said orbital member having lateral passages communicating with the piston chambers and terminating at said flat face on the orbital member in a circular series of ports arranged concentric of the orbital member and in position to communicate selectively with the passages in the valving face for the admission and discharge of fluid to and from said piston chambers when the orbital member is moved, means for connecting the annular passages in the valving face with a source of fluid supply and discharge, a coil spring seating between the closure member and said orbital member to maintain said orbital member abutting against the valving face, and a bellows connected with the casing and the orbital member and yieldable to allow said orbital movement of the orbital member.

23. A pump or fluid motor comprising a stator defining a chamber and having a flat axial face at one end of said chamber formed with separate inlet and outlet passages, fluid displacement means disposed within said stator chamber defining a plurality of fluid displacement chambers of variable volume and including an actuator disposed within said chamber and movable in bodily translatory fashion orbitally relative thereto, said actuator being formed with a flat face abutting against said flat axial stator face and formed with a plurality of passages leading to said fluid displacement chambers and terminating at said flat face on the actuator, said actuator being operative upon movement orbitally relative to the stator to slide its flat face across the abutting flat axial face of the stator to shift the actuator passages back and forth to effect cyclic communication thereof with the stator inlet and outlet passages, said actuator also being operative in so moving to establish communication alternately between each said fluid displacement chamber and said stator inlet and outlet passages through said actuator passages and to vary cyclically in succession the respective volumes of said fluid displacement chambers to alternately draw fluid thereinto from said stator inlet passage and discharge fluid therefrom to said stator outlet passage.

24. A pump comprising in combination, a casing having a cylindrical chamber therein, means providing an end wall in the chamber having an inner recess and a concentric outer annular recess, an annular rib forming part of said wall and located intermediate the recesses to separate the same, an inlet and an outlet in the casing; passageways connecting said recesses respectively with the inlet and outlet ports; a cylindrical cylinder block of smaller diameter than said chamber nonrotatably mounted therein, a face at each end of the block with one end face engaging said end wall and with the other end face having a central well therein extending only partially through said block, a plurality of cylinders formed in the periphery of the block; a cylinder port for each cylinder opening into said end face; a piston reciprocably mounted in each cylinder and having a portion extending therefrom and engaging the cylindrical wall of said chamber; a drive shaft mounted in said casing for rotation about an axis normal to the plane of the first mentioned end face; an eccentric projection on the end of said shaft and fitting movably in the well in said block for moving said block bodily in a generally circular path upon rotation of said shaft to reciprocate said pistons and to move said cylinder ports alternately into communication with said recesses; and means for exerting pressure to force the first mentioned end face of said block against the end wall of said chamber.

25. A pump comprising in combination, a casing having a cylindrical chamber therein, means providing an end wall in the chamber having an inner recess and a concentric outer annular recess, an annular rib forming part of said wall and located intermediate the recesses to separate the same, an inlet and an outlet port in the casing; means connecting said recesses respectively with the inlet and outlet ports; a cylindrical cylinder block of smaller diameter than said chamber nonrotatably mounted therein, a face at each end of the block with one end face engaging said end wall and said block having a plurality of cylinders in its periphery each with a cylinder port opening into said end face; a piston reciprocably mounted in each cylinder and having a portion extending therefrom and engaging the cylindrical wall of said chamber; a drive shaft mounted in said casing for rotation about an axis normal to the plane of said end face; crank means movably coupling said shaft to the other end face of said block for moving said block bodily in a generally circular path upon rotation of said shaft to reciprocate said pistons and to move said cylinder ports alternately into communication with said recesses; a flexible sleeve connecting said block and casing and surrounding said shaft to provide a nonrotatable seal between said cylinder ports and said shaft; and means for exerting pressure to force the first mentioned end face of said block against the end wall of said chamber.

26. A pump comprising in combination, a casing having a cylindrical chamber therein, means defining an end wall in the chamber having inlet and outlet openings; a cylindrical cylinder block of smaller diameter than said chamber nonrotatably mounted therein, a face at each end of the block with one end face engaging said end wall, a cylinder in the block provided with a cylinder port opening into said end face; a piston reciprocably mounted in said cylinder and having a portion engageable with the cylindrical wall of said chamber; a drive shaft mounted in said casing for rotation about an axis normal to the plane of the first mentioned end face; crank means movably coupling said shaft to the other end face of said block for moving said block bodily in a generally circular path upon rotation of said shaft to reciprocate said piston and to move said port alternately into communication with said openings; and means for exerting pressure to force the first mentioned end face of said block against the end wall of said chamber.

27. A pump comprising in combination, a casing having a cylindrical chamber therein, means defining an end wall in the chamber having inlet and outlet openings; a cylindrical cylinder block of smaller diameter than said chamber nonrotatably mounted therein, a face at each end of the block with one end face engaging said end wall, a cylinder in the block provided with a cylinder port opening into said end face; a piston reciprocably mounted in said cylinder and having a portion engageable with the cylindrical wall of said chamber; means for moving said block bodily in a generally circular path with said portion of the piston engaging the wall of the chamber to reciprocate the piston in the cylinder and to bring said port alternately in communication with the inlet and outlet; and means for exerting pressure to force the end face of said block against the end wall of said chamber.

28. A device of the character described comprising a casing having an annular wall extending around a casing chamber, said annular wall having substantially radial piston chambers provided with closed outer ends, an orbital member in said casing chamber of smaller diameter than the casing chamber, a rotary shaft, an eccentric on said shaft within said casing chamber connected to said orbital member to effect bodily translatory movement thereof orbitally about the shaft as the shaft rotates, pistons in said piston chambers having operative connection with the periphery of the orbital member to effect reciprocatory movement of the pistons in response to the orbital movement of the orbital member, said casing being formed with an end wall having an annular valving face in contact with an end face of the orbital member, and said casing having passageways opening through the annular valving face and communicating with the piston chambers and with a fluid inlet and discharge selectively depending upon the position of the orbital member.

29. A device of the character described comprising a casing having an annular wall and spaced end walls forming a casing chamber, said annular wall having substantially radial piston chambers provided with closed outer ends, an orbital member in said casing chamber formed with passages extending therethrough, bearings on opposite sides of said casing chamber, a drive shaft rotatable in said bearings, an eccentric on said shaft intermediate said bearings connected to the orbital member for moving the orbital member in bodily translatory fashion orbitally about the drive shaft in response to rotation of the drive shaft, pistons in said piston chambers having operative connection with the periphery of the orbital member to effect reciprocatory movement of the pistons responsive to the orbital movement of the orbital member, each of said end walls of the casing having a flat valving face in contact with opposite end faces of the orbital member, said casing having passages opening through one of the valving faces communicating with the piston chambers, the opposite end wall having spaced annular passages formed in its valving face contacted by the adjacent end face on said orbital member for admitting fluid to said chamber circumferentially of the orbital member to supply fluid to said piston chambers and for discharging fluid from said piston chambers by way of said passages through the orbital member.

30. A device of the character described including a casing having an annular wall and spaced end walls forming a casing chamber, said annular wall having substantially radial piston chambers provided with closed outer ends, an orbital member in said casing chamber of smaller diameter than the casing chamber, bearings on opposite sides of said casing chamber in concentric relation with said casing chamber, a shaft rotatable in said bearings, an eccentric on the shaft intermediate said bearings connected to the orbital member to effect bodily translatory movement of the orbital member orbitally about the shaft as the shaft rotates, pistons in said piston chambers having operative connection with the periphery of the orbital member to effect reciprocatory movement of the pistons in response to the movement of the orbital member orbitally within the casing chamber, one of said end walls of the casing having a flat valving face in contact with a flat end face of the orbital member, said casing having passageways opening through the flat valving face and communicating with the piston chambers and with a fluid inlet and discharge selectively depending upon the position of the orbital member, and springs between the closed ends of the piston chambers and the pistons to maintain said connections of the pistons with the orbital member.

31. A device of the character described including a casing member having an annular wall and spaced end walls forming a casing chamber, said annular wall having substantially radial piston chambers provided with closed outer ends, an orbital member in said casing chamber of smaller diameter than the casing chamber, bearings on opposite sides of said casing chamber in concentric relation with said chamber, a drive shaft rotatable in said bearings, an eccentric on said shaft intermediate said bearings connected rotatably to the orbital member to move the orbital member in bodily translatory fashion orbitally about the shaft as the shaft rotates, pistons in said piston chambers having operative connection with the periphery of the orbital member to reciprocate the pistons in response to the orbital movement of the orbital member, one of said end walls of the casing having a flat valving face in contact with a flat end face of the orbital member, said casing having passages opening through the flat valving face communicating with the piston chambers and with a fluid inlet and discharge selectively depending upon the position of the orbital member, and springs between the closed ends of the piston chambers and the pistons to maintain said operative connections of the pistons with the orbital member, said casing having liquid receiving pockets in the end walls opposite to the passages for balancing the pressures acting upon the respective sides of the orbital member.

32. A device of the character described comprising a casing having an annular wall and spaced end walls forming a casing chamber, an orbital member in said casing chamber, said annular wall having substantially radial piston chambers provided with closed outer ends, means eccentrically mounting the orbital member for bodily translatory movement orbitally within said casing chamber, pistons reciprocably mounted in said piston chambers, rods connecting the pistons with the orbital member, one of said casing end walls having a flat face formed with supply and discharge ports, and said orbital member being formed with a flat face abutting against said flat face on the casing end wall and with passages terminating at said flat face on the orbital member which are operative to communicate with the piston chambers, said orbital member forming a valve intermediate said supply and discharge ports and said piston chambers for controlling the flow of fluid to and from the piston chambers.

33. A device of the character described comprising a casing having an annular wall and spaced end walls forming a chamber, an orbital member in said casing chamber of smaller diameter than the casing chamber, means eccentrically mounting the orbital member for bodily translatory movement orbitally within said casing chamber, slidable vanes coacting with the orbital member and the casing for forming pressure chambers within said casing chamber, one of said end walls of the casing having a flat valving face in contact with a flat end face of the orbital member and having separated intake and discharge passages opening into the valving face, and said orbital member having passages which terminate at said end face operable in response to the orbital movement of the orbital member to alternately communicate selectively with said intake and discharge passages and to communicate with said pressure chambers.

34. A device of the character described comprising a casing having an annular wall and spaced end walls forming a chamber, an orbital member in said casing chamber of smaller diameter than the casing chamber, means eccentrically mounting the orbital member for bodily translatory movement orbitally within said casing chamber, vanes slidable within sockets of the orbital member and having portions contacting the end walls and the annular wall of the casing to cooperate with the periphery of the orbital member for forming pressure chambers, said end walls of the casing having flat valving faces in contact with the flat end faces of the orbital member and having intake and discharge passages in the respective valving faces, and said orbital member having transverse passages which terminate at said flat end faces in ports arranged in a circular series coaxial therewith and operable in response to the orbital movement of the orbital member to alternately communicate with said intake and discharge passages and having connection with said pressure chambers.

References Cited in the file of this patent

UNITED STATES PATENTS

| 436,567 | Reynolds | Sept. 16, 1890 |
| 1,156,700 | May | Oct. 12, 1915 |
| 1,617,863 | Planche | Feb. 15, 1927 |
| 1,636,486 | Planche | July 19, 1927 |
| 1,914,622 | Smith | June 20, 1933 |
| 1,920,123 | Ernst | July 25, 1933 |
| 1,924,423 | Svenson | Aug. 29, 1933 |
| 1,960,035 | Warren | May 22, 1934 |
| 2,107,090 | Swennes | Feb. 1, 1938 |
| 2,275,240 | Wiken | Mar. 3, 1942 |
| 2,303,969 | Wiken | Dec. 1, 1942 |
| 2,394,285 | Bevins | Feb. 5, 1946 |
| 2,427,253 | Browne | Sept. 9, 1947 |
| 2,621,606 | Carlson | Dec. 16, 1952 |
| 2,636,444 | Salgues | Apr. 28, 1953 |

FOREIGN PATENTS

| 351,011 | Great Britain | 1931 |
| 760,299 | France | 1933 |